US012248850B2

(12) United States Patent
Morel et al.

(10) Patent No.: US 12,248,850 B2
(45) Date of Patent: Mar. 11, 2025

(54) QUANTUM DEVICE WITH MULTIPLEXED ELECTROMETER OUTPUT SIGNALS

(71) Applicants: COMMISSARIAT A L'ENERGIE ATOMIQUE ET AUX ENERGIES ALTERNATIVES, Paris (FR); CENTRE NATIONAL DE LA RECHERCHE SCIENTIFIQUE, Paris (FR)

(72) Inventors: Adrien Morel, Grenoble (FR); Gérard Billiot, Grenoble (FR); Gaël Pillonnet, Grenoble (FR); Tristan Meunier, Grenoble (FR)

(73) Assignees: COMMISSARIAT A L'ENERGIE ATOMIQUE ET AUX ENERGIES ALTERNATIVES, Paris (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 592 days.

(21) Appl. No.: 17/643,236

(22) Filed: Dec. 8, 2021

(65) Prior Publication Data

US 2022/0188687 A1 Jun. 16, 2022

(30) Foreign Application Priority Data

Dec. 10, 2020 (FR) ..................... 20 12968

(51) Int. Cl.
*G06N 10/40* (2022.01)
*G06N 10/20* (2022.01)
(52) U.S. Cl.
CPC ............. *G06N 10/40* (2022.01); *G06N 10/20* (2022.01)

(58) Field of Classification Search
CPC .... G06F 1/20; G06F 11/0724; G06F 11/0751; G06F 11/0793; G06F 15/16;
(Continued)

(56) References Cited

U.S. PATENT DOCUMENTS

| 10,763,347 | B2* | 9/2020 | Amin | ...................... H01L 29/12 |
| 2019/0334020 | A1* | 10/2019 | Amin | .................... H01L 29/423 |
| 2020/0350423 | A1* | 11/2020 | Pillarisetty | ............ H01L 29/127 |

OTHER PUBLICATIONS

French Preliminary Search Report issued Aug. 30, 2021 in French Application 20 12968 filed on Dec. 10, 2020, citing documents AO-AU therein, 4 pages (with English Translation of Categories of Cited Documents).

(Continued)

*Primary Examiner* — Binh C Tat
(74) *Attorney, Agent, or Firm* — Oblon, McClelland, Maier & Neustadt, L.L.P.

(57) ABSTRACT

A quantum device includes several spin qubits arranged as a matrix and each comprising a quantum dot; several electrometers each electrostatically coupled to a potential well of one of the quantum dots; and circuits for applying an excitation signal to an input electrode of each electrometer. The circuits are configured such that a value of the frequency, phase or maximum amplitude of each excitation signal is different from that of the other excitation signals, and the circuits apply a same excitation signal on electrometers coupled to a same row of qubits. The device also includes a transimpedance amplifier having an input coupled to output electrodes of the electrometers and a demultiplexing circuit including an input electrically coupled to an output of the transimpedance amplifier and configured to demultiplex the output signals to be delivered by the electrometers.

17 Claims, 10 Drawing Sheets

(58) Field of Classification Search
CPC ...... G06F 16/137; G06F 18/295; G06F 17/16;
G06F 2111/20; G06F 30/27; G06F 30/28;
G06F 18/2323; G06F 9/30098; G06F
9/30145; G06F 9/382; G06F 9/3861;
G06F 9/3869; G06F 9/5016; G06F 17/18;
G06F 7/49947; G06F 21/76; G06F 15/76;
G06F 15/7817; G06F 15/80; G06F
9/3836; H01L 29/66977; H01L 29/127;
H01L 29/7782; H01L 29/122; H01L
29/66984; H01L 29/775; H01L 29/15;
G06N 10/00; G06N 5/01; G06N 3/08;
G06N 10/20; G06N 3/088; G06N 10/40;
G06N 10/60; G06N 10/80; G06N 20/00;
G06N 10/70; G06N 3/045; G06N 99/00;
G06N 3/04; G06N 20/10; G06N 3/047;
G06N 3/048; G06N 3/063; G06N 3/084;
G06N 7/01; G06N 3/044; G06N 3/06;
G06N 3/067; G06N 7/02
USPC .................................................. 716/100–108
See application file for complete search history.

(56) References Cited

OTHER PUBLICATIONS

Meunier et al., "Qubit read-out in Semiconductor quantum processors: challenges and perspectives", 2019 IEEE International Electron Devices Meeting (IEDM), Dec. 7, 2019, 4 pages.

Xue et al., "CMOS-based cryogenic control of silicon quantum circuits", arxiv.org, Sep. 29, 2020, 17 pages.

Le Guevel et al., "19.2 A 110mK 295µW 28nm FDSOI CMOS Quantum Integrated Circuit with a 2.8GHz Excitation and nA Current Sensing of an On-Chip Double Quantum Dot", 2020 IEEE International Solid-State Circuits Conference (ISSCC), Feb. 16, 2020, pp. 306-308.

Le Guevel et al., "Low-power transimpedance amplifier for cryogenic integration with quantum devices", Applied Physics Reviews, vol. 7, No. 4, Dec. 4, 2020, 12 pages.

Tagliaferri et al., "Modular Printed Circuit Boards for Broadband Characterization of Nanoelectronic Quantum Devices", IEEE Transactions on Instrumentation and Measurement, vol. 65, No. 8, Aug. 1, 2016, pp. 1827-1835.

Hornibrook et al., "Frequency Multiplexing for Readout of Spin Qubits", Applied Physics Letters, vol. 104, No. 10, Dec. 18, 2013, 4 pages.

Van Dijk et al., "The electronic interface for quantum processors", arxiv.org, Nov. 5, 2018, 15 pages.

Reilly et al., "Fast single-charge sensing with a rf quantum point contact", Applied Physics Letters 91, 162101, 2007, 4 pages.

Zurita et al., "Cryogenic Current Steering DAC With Mitigated Variability", IEEE Solid-State Circuits Letters, vol. 3, 2020, pp. 254-257.

Lai et al., "An Experimental Ultra-Low-Voltage Demodulator in 0.18-µm CMOS", IEEE Transactions on Microwave Theory and Techniques, vol. 57, No. 10, Oct. 2009, 11 pages.

Zhao et al., "A low-power cryogenic analog to digital converter in standard CMOS technology", Cryogenics 55-56, 2013, pp. 79-83.

Masciotti et al., "Digital Lock-In Detection for Discriminating Multiple Modulation Frequencies with High Accuracy and Computational Efficiency", IEEE Transactions on Instrumentation and measurement, vol. 57, No. 1, Jan. 2008, 8 pages.

* cited by examiner

QUANTUM DEVICE WITH MULTIPLEXED ELECTROMETER OUTPUT SIGNALS

TECHNICAL FIELD AND PRIOR ART

The invention relates to the field of quantum devices, quantum information processing and quantum computing.

Quantum computing is based on the use of a quantum state with two measurable levels as an information vector, called a qubit or quantum bit, and laws of quantum mechanics (superposition, entanglement, measurement) to execute algorithms. A quantum device, or calculator, with spin qubits makes it possible to manipulate quantum state of these qubits, especially in order to carry out operations.

Unlike a so-called conventional electronic or computing machine (operating with two voltage levels defined as corresponding to binary states 0 and 1), a quantum device is similar to an analogue machine, in that the quantum state of qubits can take on an infinite number of values.

Contemplated applications for quantum devices are numerous, from molecule simulation for medicine and the design of new vaccines and drugs to cryptography (implementation of the Shor algorithm), machine learning and simulation of quantum phenomena.

Spin qubits can be formed in semiconductors, advantageously silicon. Semiconductor technologies are being investigated for making spin qubits because of their high integration potential, similar to conventional electronics. Electrons or holes are individually confined in quantum wells maintained at cryogenic temperatures (of less than 1 K) in a cryostat and made within electrostatically defined, nanosized confinement structures and, in the case of silicon, with an architecture similar to that of MOSFETs. These confinement structures correspond to quantum boxes, also known as quantum dots. A quantum dot behaves as a potential well that confines one or more elementary charges (electrons or holes) in a semiconductor region.

The application of a static magnetic field (for example between 100 mT and 1 T) makes it possible to reveal the spin of the quasi-particles, which is a quantum system with two measurable levels, named "spin down" and "spin up". Their quantum state is a superposition of these two states represented by the direction of an arrow within a sphere, called a Bloch sphere. The manipulation (rotation) of these spins is carried out using an AC component of the magnetic field (with a frequency of, for example, between 1 GHz and several tens of GHz) or using an AC electric field at the same frequencies in the case of a sufficient spin-orbit interaction (case of holes in silicon). Reading out the (up or down) spins makes it possible to extract part of the quantum information according to its probability of being in each state, determined by the quantum superposition.

Reading out a spin qubit is achieved by using another quantum dot, called a read-out quantum dot, coupled to the spin qubit to be read out. These two quantum dots form two potential wells separated by a potential barrier. Each of the two quantum dots includes an electrostatic control gate arranged on a first semiconductor region in which the potential wells of the quantum dots are formed. The potential wells are arranged between second semiconductor regions forming reservoirs of charge carriers, called source and drain by analogy with MOSFET technology. The spin of the quasi-particle (electron or hole) present in the quantum dot of the qubit to be read out is used as a "reference spin" while the spin of the quasi-particle present in the read-out quantum dot is measured after it has been manipulated.

A first method for reading out spin qubits is to measure the capacitance between the quantum dot of the qubit to be read out and the read-out quantum dot, which corresponds to an image of their relative states. For this, a so-called reflectometry device is generally used. A high frequency signal (for example between 100 MHz and a few GHz) is sent to the gate of the read-out quantum dot from test instruments placed at room temperature. The signal is reflected and then demodulated. An inductor is placed at the end of the row at the qubit to create an LC resonator comprised of this inductor, a stray capacitance and the quantum capacitance $C_q$ formed by the qubit. As the value of $C_q$ varies, the phase and amplitude of the reflected signal vary, which can be detected by measurement instruments placed at room temperature. It is thus possible to know the relative (parallel or anti-parallel) state of the spin of the electron present in the read-out quantum dot as a function of the spin state of the electron present in the quantum dot of the qubit to be read.

With this first read-out method, it is necessary either to output a number of wires equal to the number of qubits to be excited, which becomes impossible when the number of qubits is large, for example more than 1000, or to send several signals at different frequencies through the same wire and to discriminate these frequencies by virtue of the LC resonators placed at cryogenic temperature. In the latter solution, it is therefore necessary that the resonance frequency of the LC resonator associated with each qubit is calibrated and different for each resonator. There is thus a compromise to be found between the frequency spacing between each qubit (defined by the quality factor of the LC resonators, since the higher the quality factor, the greater the number of qubits addressed by a single row), the surface area taken up by the inductors (the smaller the inductor, the lower its quality factor) and the time taken by the read-out (inversely proportional to the quality factor of the LC resonator).

Additionally, with this first read-out method, the use of magnetic cores to promote integration of the inductors is limited by the strong static magnetic field required to make the spin of the quasi-particles appear and which saturates magnetic permeabilities of the cores. Air-core inductors do not face this problem, but they occupy a much larger surface area, limiting their massive use inside the cryostat.

Inter-inductor coupling can also raise new problems, when measuring qubits simultaneously using several of these inductors excited by reflectometry signals.

A second method is to measure the conductance of an electrometer coupled to the quantum dot of the qubit to be read, this conductance being an image of the state of the qubit. Indeed, by virtue of the Zeeman effect (separation of an atomic energy level into several distinct energy sub-levels under the effect of an external magnetic field), when the spin of the quasi-particle is oriented upwards, it is necessarily on the "high" energy state (state that will be referred to as H). Conversely, if the spin of the quasi-particle is oriented downwards, the quasi-particle is on a "low" energy state (state that will be referred to as L). By placing the energy level of the reservoir in proximity to a quantum dot between H and L, the quasi-particle will tend to escape from the quantum dot when it is in the H state and remain in the quantum dot when it is in the L state (Pauli blockade). It is thus possible to convert the spin of the quasi-particle into charge information (quasi-particle present or not in the quantum dot), this conversion being commonly called "spin-to-charge conversion". This charge information can be read by an electrometer such as a Single Electron Transistor (SET) or a Quantum Point Contact (QPC), whose conductance varies according to its electrostatic environment.

With this second method, the spin variation of the quasiparticle is converted into a charge variation of the quantum dot (by virtue of Pauli blockade) which causes a variation in the conductance of the electrometer, which in turn results in a variation in the current flowing in the electrometer. This current can then be amplified by a transimpedance amplifier (TIA). Usually, this read-out is used with a TIA placed at room temperature and connected to an electrometer. It is therefore not possible to use this solution to address a large number of qubits, for example a whole matrix of qubits, because it would be necessary either to output a number of wires at least equal to the number of qubits addressed, which requires a much too large space, or to arrange all the TIAs in the cryostat, which is not possible given the cooling capacities of the current cryostats (1 W maximum for operation at 4K, or 1 mW for operation at 100 mK). Furthermore, the read-out speed of such a solution is limited by the capacitance of the wires (between 100 and 300 pF) to be charged upstream of the TIAs placed at room temperature. The bandwidth of such a system could hardly exceed about 10 kHz.

DISCLOSURE OF THE INVENTION

Thus there is a need to provide a quantum device that can include a large number of qubits, for example at least 1000 qubits, and that does not have the drawbacks associated with the qubit read-out methods of prior art.

For this, one embodiment provides a quantum device including at least:
  several spin qubits each comprising at least one quantum dot, or quantum box;
  several electrometers each electrostatically coupled to a potential well of the quantum dot of one of the spin qubits;
  circuits for applying at least one excitation signal to at least one input electrode of each of the electrometers, configured such that a value of at least one parameter from the frequency, phase and maximum amplitude of each of the excitation signals is different from that of the other excitation signals;
  a transimpedance amplifier, or TIA, comprising an input electrically coupled to output electrodes, distinct from the input electrodes, of at least two of the electrometers to which output signals are to be delivered;
  a demultiplexing circuit including an input electrically coupled to an output of the transimpedance amplifier, and configured to demultiplex the output signals to be delivered from the electrometers.

In this quantum device, the output signals delivered from the electrometers are multiplexed to the input of the TIA. Demultiplexing these signals is then performed at the output of the TIA. Thus, the quantum device can read out several qubits, advantageously a large number of qubits (for example more than 1000), involving a number of TIAs much lower than the number of qubits.

The implementation of such a multiplexing—demultiplexing of the output signals of the electrometers is possible by virtue of the excitation signals applied as an input to the electrometers, which make it possible to associate a certain characteristic or feature with each of the electrometers, and therefore with each of the qubits read out, and to find the origin of the output signals of the electrometers, after demultiplexing, by virtue of these characteristics which are found in the output signals of the electrometers.

Throughout the document, the term "electrically coupled" can refer to either a direct electrical connection or an indirect electrical connection, that is made through one or more intermediate elements.

The excitation signal applied as an input to each electrometer corresponds to a signal that modifies the current generated as an output by that electrometer. The current output from the electrometer contains the discriminating information provided by the excitation signal applied thereto as an input.

When the electrometer is a single electron transistor, if the excitation signal is applied to an electrostatic control gate of the electrometer, the excitation signal varies the internal energy levels of the electrometer.

Throughout this document, the terms "row" and "column" have been chosen arbitrarily. In a plane, the term "row" is generally associated with a horizontal arrangement and the term "column" is generally associated with a vertical arrangement. However, these terms should not be construed solely in terms of this arrangement, but as referring to two orientations in a plane that are substantially perpendicular to each other. For example, the term "row" may be associated, in a plane, with a vertical arrangement, and the term "column" may be associated with a horizontal arrangement.

The quantum device may further include a cryostat including a chamber configured to be maintained at a temperature less than or equal to 4K and in which at least the spin qubits, electrometers, circuits for applying the excitation signals, transimpedance amplifier and demultiplexing circuit are arranged. This configuration is possible by virtue of the fact that each electrometer is not associated with its own TIA.

In another configuration, the quantum device may further include a cryostat including a chamber configured to be maintained at a temperature less than or equal to 4K and in which at least the spin qubits, electrometers and transimpedance amplifier are arranged.

It is advantageous that the circuits for applying the excitation signals are at the same temperature level as the demultiplexing circuit, as this simplifies the implementation of the demultiplexing (which in this case uses the excitation signals).

Advantageously:
  the cryostat chamber may include a first part configured to be maintained at a temperature of less than 1K and a second part configured to be maintained at a temperature between 1K and 4K;
  the spin qubits, electrometers and transimpedance amplifier may be arranged in the first part of the cryostat chamber;
  the circuits for applying the excitation signals and demultiplexing circuit may be arranged in the second part of the cryostat chamber.

Once again, this advantageous configuration is possible by virtue of the fact that the TIA is pooled and used for the read-out of several electrometers.

The quantum device may further include circuits for biasing the electrometers configured to apply bias DC voltages to the electrometers.

The circuits for applying at least one excitation signal to at least one input electrode of each of the electrometers are be configured to apply AC excitation signals to the input electrodes of each of the electrometers. Each of these excitation signals comprises at least one alternative component, and possibly a DC component.

The electrometers may be single electron transistors (or SETs) and/or quantum point contacts (or QPCs).

When the electrometers correspond to single electron transistors, the circuits for applying the excitation signals may be coupled to the gate or source or drain of each of the single electron transistors, or may be coupled to the gate and source of each of the single electron transistors, or may be coupled to the gate and drain of each of the single electron transistors. The electrode or electrodes to which the excitation signal is applied correspond to the input electrode or electrodes of the electrometer. If the excitation signal is applied to the source or drain of the electrometer, the output electrode corresponds to the drain or source of the electrometer respectively. If the excitation signal is applied only to the gate of the electrometer, the output electrode may correspond to the drain or source of the electrometer.

When the electrometers correspond to quantum point contacts, the circuits for applying the excitation signals may be coupled to a first of two electrodes (also called conductors or conductive regions of the quantum point contact, and which are arranged opposite to each other) of each of the quantum point contacts, thereby forming the input electrode of the electrometer. The output electrode corresponds to the second of both electrodes of each of the quantum point contacts.

The quantum device may further include circuits for biasing the electrometers configured to:
  when the electrometers correspond to single electron transistors, apply DC bias voltages to a gate and a drain of each of the single electron transistors when the circuits for applying the excitation signals are coupled to the gate and/or drain of each of the single electron transistors, or to a gate and a source of each of the single electron transistors when the circuits for applying the excitation signals are coupled to the gate and/or source of each of the single electron transistors;
  when the electrometers correspond to quantum point contacts, apply DC bias voltages to the first of both electrodes of each of the quantum point contacts, that is the electrodes to which the excitation signals are applied.

The DC bias voltages are different from the AC excitation signals. According to the embodiments, the DC bias voltages applied to the electrometers may be identical or different from each other.

According to one exemplary embodiment, the circuits for biasing the electrometers may include at least:
  a digital-to-analogue converter, configured to receive as an input at least one digital signal coding values of bias voltages of the electrometers;
  a demultiplexer comprising an input electrically coupled to an output of the digital-to-analogue converter, and several outputs to which the bias voltages of the electrometers are to be delivered;
  sample-and-hold devices each comprising an input electrically coupled to an output of the demultiplexer.

The qubits are arranged by forming a matrix of qubits.

The electrometers may be arranged by forming a matrix of electrometers arranged facing the matrix of qubits such that the quantum dot of each of the qubits is electrostatically coupled to a quantum dot of one of the electrometers.

Each of the circuits for applying at least one excitation signal is configured to apply the same excitation signal to the input electrodes of electrometers coupled to qubits arranged on a same row of the matrix of qubits.

The output electrodes of electrometers coupled to qubits arranged on a same column of the matrix of qubits may be coupled to the input of a same transimpedance amplifier.

The quantum device may be such that:
  each of the circuits for applying at least one excitation signal may form a first circuit for applying at least one first excitation signal configured to apply a same first excitation signal to first input electrodes of electrometers coupled to qubits arranged on a same row of the matrix of qubits;
  the quantum device further includes second circuits for applying at least one second excitation signal, each configured to apply a same second excitation signal to second input electrodes of electrometers coupled to qubits arranged on a same column of the matrix of qubits;
  said first and second application circuits are configured such that a value of at least one parameter from the frequency, phase and maximum amplitude of each of the first and second excitation signals is different from that of the other excitation signals;
  the input of the transimpedance amplifier is electrically coupled to an output electrode of each of the electrometers.

The quantum device may further include:
  a digitising circuit comprising inputs coupled to outputs of the demultiplexing circuit and configured to digitise the output signals to be delivered from the demultiplexing circuit, or
  an analogue-to-digital converter interposed between the input of the demultiplexing circuit and the output of the transimpedance amplifier.

When the digitising circuit comprises inputs coupled to outputs of the demultiplexing circuit, the demultiplexing performed is therefore an analogue demultiplexing.

When the analogue-to-digital converter is interposed between the demultiplexing circuit and the transimpedance amplifier, the demultiplexing performed is therefore a digital demultiplexing. The advantage of digital demultiplexing over analogue demultiplexing is that it can be implemented with fewer demultiplexers. On the other hand, it requires analogue-to-digital converters that have to operate at high frequency, consume little power and introduce little quantization noise. In addition, a digital demodulator is more complex to build than an analogue demodulator.

When the quantum device includes the digitising circuit:
  the demultiplexing circuit may include several mixers each including a first input electrically coupled to the output of the transimpedance amplifier and a second input configured to receive one of the excitation signals;
  the digitising circuit may include several integrators, or more generally a set of filtering cells, each comprising an input electrically coupled to an output of one of the mixers, and several comparators, or more generally analogue-to-digital converters, each comprising an input electrically coupled to an output of one of the integrators.

When the quantum device includes the cryostat and the digitising circuit, the circuits for applying the excitation signals, the demultiplexing circuits and the digitising circuits may be arranged in the cryostat chamber.

In this case:
  the cryostat chamber may include a first part configured to be maintained at a temperature of less than 1K and a second part configured to be maintained at a temperature between 1K and 4K;
  the spin qubits, electrometers and transimpedance amplifier may be arranged in the first part of the cryostat chamber;

the circuits for applying the excitation signals, the demultiplexing circuit and the digitising circuit may be arranged in the second part of the cryostat chamber.

The frequency of each of the excitation signals may be different from that of the other excitation signals, and these frequencies may be, for example, between 1 kHz and 1 MHz when characterising the spin qubits and the electrometers, or between 1 MHz and 1 GHz when reading out the spin qubits.

BRIEF DESCRIPTION OF THE DRAWINGS

The present invention will be better understood upon reading the description of exemplary embodiments given purely by way of indication and in no way limiting purposes with reference to the appended drawings in which.

Identical, similar or equivalent parts of the various figures described hereinafter bear the same reference numerals so as to facilitate switching from one figure to another.

The various parts shown in the figures are not necessarily shown on a uniform scale, in order to make the figures more legible.

The various possibilities (alternatives and embodiments) should be understood as not being exclusive of each other and may be combined with each other.

DETAILED DISCLOSURE OF PARTICULAR EMBODIMENTS

One exemplary embodiment of a quantum device 100 according to a first embodiment is described below in connection with FIG. 1.

The device 100 includes several spin qubits each comprising at least one quantum dot 102. In the exemplary embodiment shown in FIG. 1, four spin qubits are shown. However, the device 100 may include a different number of qubits, for example between 2 and 10,000 qubits.

The qubits in device 100 correspond to spin qubits made in a semiconductor layer, for example silicon or germanium. The charges whose spin is to be read out may correspond to electrons or holes.

The device 100 includes several electrometers 104 each electrostatically coupled to a potential well of the quantum dot 102 of one of the spin qubits. In the exemplary embodiment shown in FIG. 1, four electrometers 104 are shown.

Figure 1:
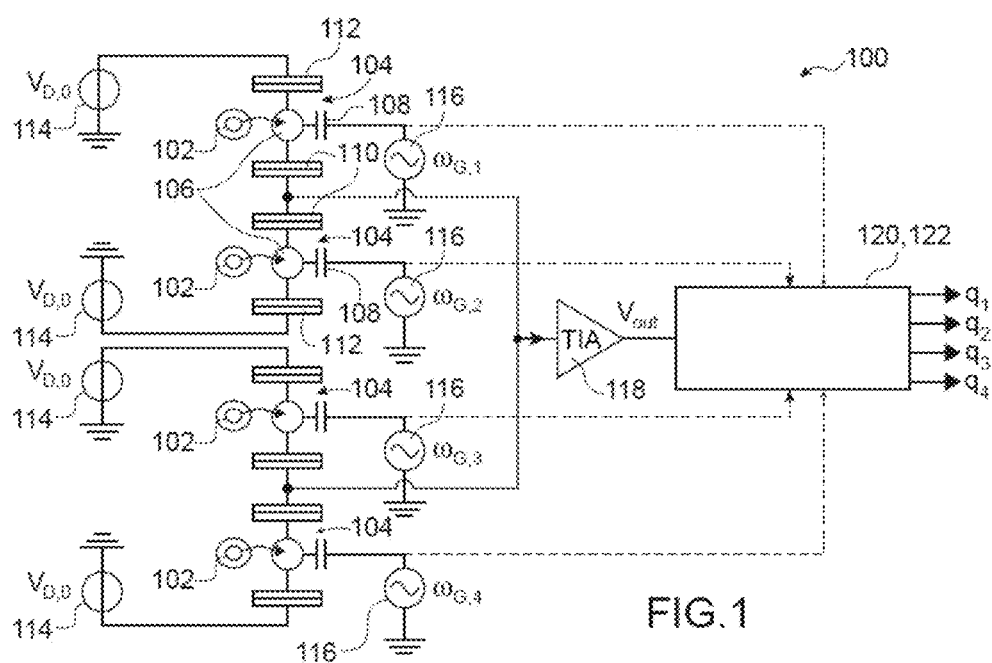
FIG. 1 schematically shows a quantum device according to a first embodiment.

Further, in the exemplary embodiment of FIG. 1, the electrometers 104 correspond to single electron transistors, or SETs. Each of the electrometers 104 includes a quantum dot 106 electrostatically coupled to that of the qubit to which the electrometer 104 is coupled. Each of the SET-type electrometers 104 further includes a gate 108, a source 110 and a drain 112.

In the example of FIG. 1, the sources 110 of the four electrometers 104 are electrically connected to each other and form output electrodes of the electrometers 104, and the gates 108 and drains 112 of the electrometers form input electrodes of the electrometers 104.

Alternatively, the electrometers 104 may correspond to quantum point contacts, or QPCs. In this case, each QPC includes two electrodes (also referred to as conductors or conductive regions of the QPC, and which are arranged opposite to each other), with a first of both electrodes of each QPC forming a QPC input electrode and a second of both electrodes of each QPC forming a QPC output electrode. Exemplary embodiments of such QPCs are described, for example, in document "Fast single-charge sensing with a rf quantum point contact" by D. J. Reilly et al, APPLIED PHYSICS LETTERS 91, 162101, 2007.

The device 100 further includes circuits 114 for biasing the electrometers configured to, when the electrometers 104 correspond to SETs as in FIG. 1, apply DC bias voltages to the input electrodes of the SETs, that is to the gate 108 and drain 112 of each of the SETs considering the configuration shown in FIG. 1. In the example of FIG. 1, the circuits 114 are symbolically represented by four DC voltage generators electrically coupled to the drains 112 of the SETs 104 and generating DC voltages called $V_{D,0}$. In the example of FIG. 1, all SETs 104 are biased with DC voltages $V_{D,0}$ of the same value. As a variant, it is possible that SETs 104 are biased using DC voltages of different values. The electrical connections between the gates 108 of the SETs 104 and the circuits 114 are not shown.

When the electrometers 104 correspond to QPCs, the circuits 114 are configured to apply DC bias voltages to the first of both electrodes serving as the input electrode of each of the QPCs. Considering the example in FIG. 1, this amounts to applying DC voltages $V_{D,0}$ (having identical or different values) to the first of both electrodes of each QPC.

The electrometers 104 are biased in such a way as to achieve a large difference in conductance within the electrometers 104 depending on the spin orientation of the charges in the qubits, which will result in output signals of different amplitudes depending on the spin orientation of the charges. For example, the current flowing through an SET-type electrometer 104 may be in the order of one pA if an electron present in the quantum dot 102 electrostatically coupled to that of the SET has its spin oriented downwards, and in the order of one nA if the electron has its spin oriented upwards.

The device 100 further includes circuits 116 for applying at least one excitation signal to at least one input electrode of each of the electrometers 104. These circuits 116 are configured such that a value of at least one parameter from the frequency, phase and maximum amplitude of each of the excitation signals is different from that of the other excitation signals. In the exemplary embodiment described in connection with FIG. 1, the excitation signals correspond to periodic, for example sinusoidal, signals referred to as $w_{G,1}$, $w_{G,2}$, $w_{G,3}$, $w_{G,4}$ and having frequencies different from each other, referred to as $f_1$ to $f_4$. In the exemplary embodiment described herein, $f_1=10$ MHz, $f_2=11$ MHz, $f_3=12$ MHz, $f_4=13$ MHz.

In the exemplary embodiment shown in FIG. 1, the input electrodes of the electrometers 104 to which the excitation signals are applied correspond to the gates 108 of the electrometers 104.

According to a first alternative, the input electrodes of the electrometers 104 to which the excitation signals are applied may correspond to the drains 112 of the electrometers 104.

According to a second alternative, the input electrodes of the electrometers 104 to which the excitation signals are applied may correspond to the gates 108 and drains 112 of the electrometers 104.

According to a third alternative, when the output electrodes of the electrometers 104 correspond to the drains 112, the input electrodes of the electrometers 104 to which the excitation signals are applied may correspond to the sources 110 and/or gates 108 of the electrometers 104. In this third alternative, the DC bias voltages delivered by the circuits 114 are applied to the gate 108 and source 110 of each of the SET-type electrometers 104.

When the electrometers 104 correspond to QPCs, the excitation signals are applied by the circuits 106 to the input electrode of each of the QPCs, that is the same electrode to which the bias voltage delivered by the circuit 114 is applied.

More generally, regardless of the type of electrometers 104 that the device 100 includes, the device 100 may include circuits 114 applying DC bias voltages to the electrometers 104 and circuits 116 applying AC excitation signals to the electrometers 104. It could be noted that an electrode of an electrometer may receive a DC biasing voltage and an AC excitation signal which are "superimposed" in order to obtain a good global DC biasing of the electrometer such that the electrometer "respond" to the excitation signal in the desired operating conditions of the electrometer.

In this device 100, when the spin orientation of the charge of one of the qubits changes, the electrometer 104 coupled to this qubit senses this change, which produces a variation in its conductance and the generation, to an output electrode of the electrometer 104 (corresponding to the source 110 in the example of FIG. 1), of a periodic current with a frequency equal to that of the excitation signal applied to its input electrode. The amplitude of this current depends on the spin orientation of the charge contained in the qubit coupled to the electrometer 104. For example, this amplitude may be in the order of one or a few pA if the spin is oriented downwards, and in the order of one or a few nA if the spin is oriented upwards.

Alternatively, the device 100 may include attenuators interposed between the circuits 116 and the electrometers 104 in order to attenuate amplitude of the excitation signals applied to the input electrodes of the electrometers 104. These attenuators correspond, for example, to capacitive divider bridges.

The device 100 further includes at least one transimpedance amplifier, or TIA, 118 comprising an input electrically coupled to an output electrode of at least two of the electrometers 104 to which an output signal is to be delivered. In the example of FIG. 1, the output signal of the TIA 118 in which the output signals delivered from the electrometers 104 are multiplexed is referred to as $V_{out}$.

In the exemplary embodiment shown in FIG. 1, the device 100 includes a single TIA 118 whose input is electrically coupled to the output electrodes (the sources 110 in FIG. 1) of all the electrometers 104. Alternatively, the device 100 may include several TIAs 118, each comprising an input electrically coupled to outputs of different groups of electrometers 104.

When the electrometers 104 correspond to QPCs, the output electrodes of the electrometers 104 coupled to the input of the TIA 118 correspond to the second electrodes to which the DC bias voltage is not applied.

The device 100 further includes a demultiplexing circuit 120 including an input coupled to an output of the TIA 118, and configured to demultiplex the output signals to be delivered from the electrometers 104 and combined as an input to the TIA 118. The demultiplexing circuit 120 includes several outputs at which the signals combined into the output signal of the TIA 118 are separated from each other and delivered.

Alternatively, it is possible that the device 100 includes a second demultiplexing circuit, not visible in FIG. 1, for use in a step for characterising the electrometers 104, in order to accurately determine values of the bias voltages to be applied to the electrometers 104. This second demultiplexing circuit may or may not be similar to the demultiplexing circuit 120, and may be designed such that it consumes more power than the demultiplexing circuit 120 because it is only used during this phase of characterising the electrometers 104 and not during each read-out of the qubits.

The device 100 also includes a digitising circuit 122 comprising inputs coupled to the outputs of the demultiplexing circuit 120, and configured to digitise the output signals to be delivered by the demultiplexing circuit 120. In the exemplary embodiment shown in FIG. 1, the digitising circuit 122 includes a number of outputs equal to the number of electrometers 104, that is here four outputs. In the example of FIG. 1, the output signals of the digitising circuit 122 are referred to as $q_1$, $q_2$, $q_3$ and $q_4$.

Although not visible in FIG. 1, the device 100 further includes a cryostat including a chamber configured to be maintained at a temperature less than or equal to 4K and in which at least the spin qubits, electrometers 104, circuits 114 for biasing the electrometers 104, circuits 116 for applying the excitation signals, TIA 118, demultiplexing circuit 120 and digitising circuit 122 are arranged.

Advantageously, the cryostat chamber includes a first part configured to be maintained at a temperature of less than 1K, for example between 10 mK and 100 mK, and a second part configured to be maintained at a temperature between 1K and 4K. In this case, the spin qubits, electrometers 104 and TIA 118 are for example arranged in the first part of the cryostat chamber, and the circuits 114 for biasing the electrometers 104, circuits 116 for applying the excitation signals, demultiplexing circuit 120 and digitising circuit 122 are for example arranged in the second part of the cryostat chamber. Alternatively, it is possible that the TIA 118 is arranged in the second part of the cryostat chamber. According to another alternative, it is possible that, in addition to the spin qubits, electrometers 104 and TIA 118, the circuits 114 for biasing the electrometers 104 and/or circuits 116 for applying the excitation signals and/or demultiplexing circuit 120 and/or digitising circuit 122 are arranged in the first part of the cryostat chamber.

The operation of the previously described device 100 is explained below in connection with FIGS. 2 to 5.

Figure 2:
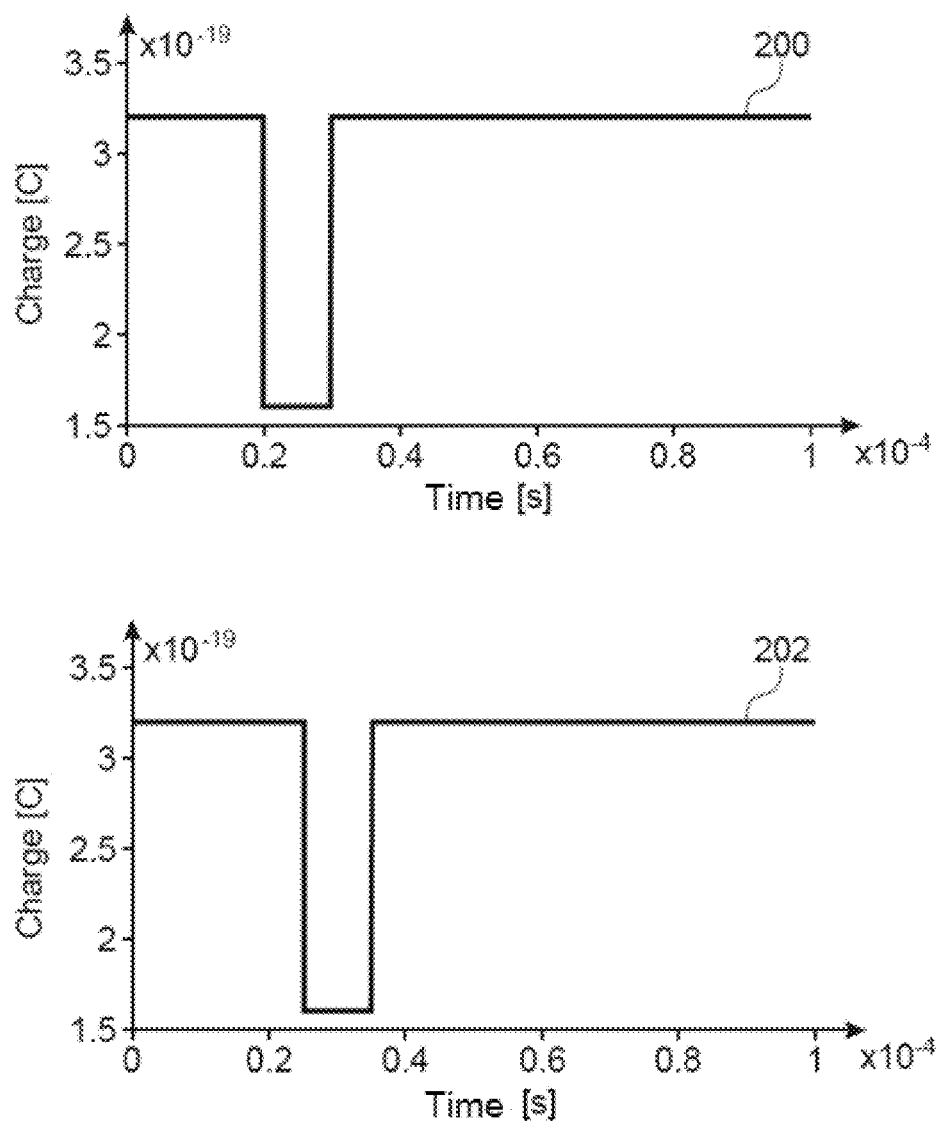
FIGS. 2 to 5 show examples of signals obtained in the quantum device according to the first embodiment.

In each qubit, when the spin of the electron or hole present in the quantum dot 102 of the qubit changes orientation, the charge in this quantum dot 102 changes. This charge modification in the quantum dot 102 of the qubit is sensed by the electrometer 104 which is coupled to the qubit. FIG. 2 shows electrical signals corresponding to the charge modification in the quantum dots 102 of the first qubit (signal denoted by reference 200) and the fourth qubit (signal denoted by reference 202), the first qubit corresponding to that coupled to the electrometer 104 to which the excitation signal $w_{G,1}$ is applied and the fourth qubit corresponding to that coupled to the electrometer 104 to which the excitation signal $w_{G,4}$ is applied. In the operation example described here, no charge modification occurs in the second and third qubits (those coupled to the electrometers 104 to which the excitation signals $w_{G,2}$ and $w_{G,3}$ are applied).

Figure 3:
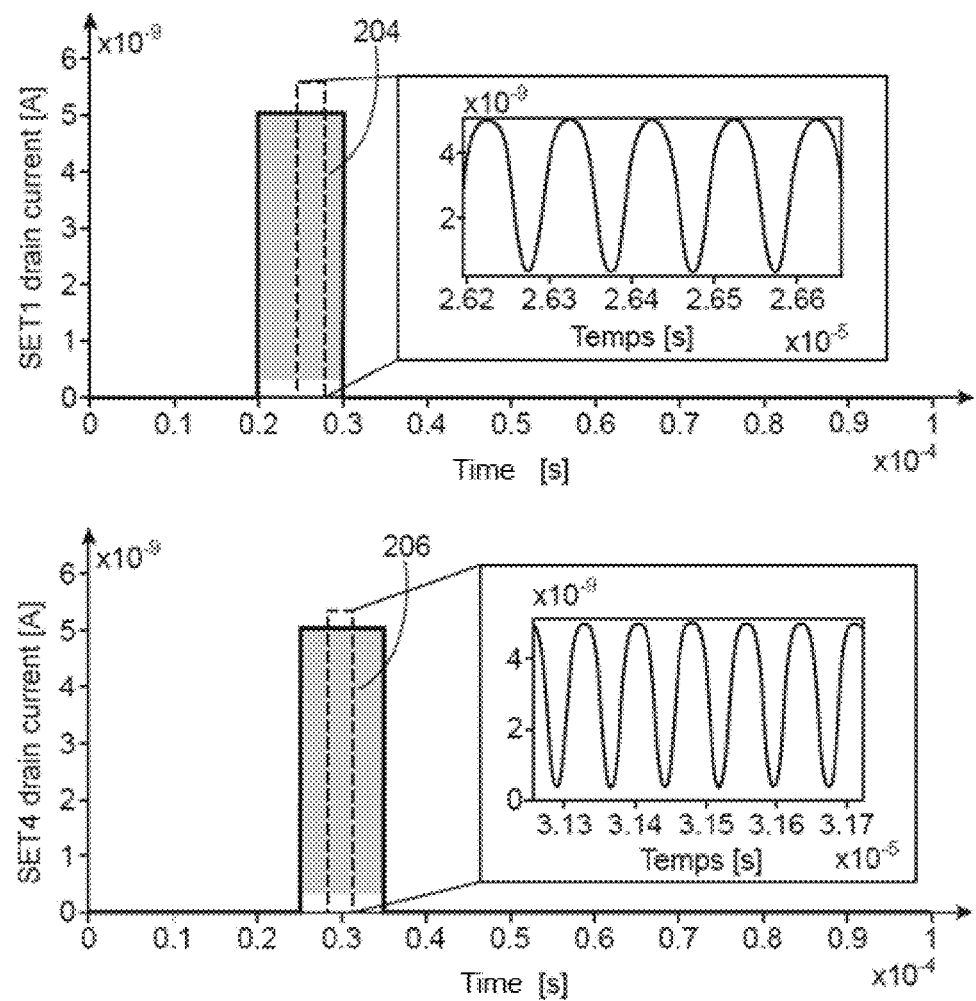

The current output from the sources of the SETs 104 sensing such a charge modification in the quantum dots 102 increases significantly. Each of these currents includes oscillations with a frequency equal to that of the excitation current applied as an input to the corresponding SET 104. In the example described here, the frequency of the excitation signal applied to the electrometer 104 coupled to the first qubit corresponds to $f_1$=10 MHz, that of the excitation signal applied to the electrometer 104 coupled to the second qubit corresponds to $f_2$=11 MHz, that of the excitation signal applied to the electrometer coupled to the third qubit corresponds to $f_3$=12 MHz, and that of the excitation signal applied to the electrometer 104 coupled to the fourth qubit corresponds to $f_4$=13 MHz. FIG. 3 shows currents delivered to the sources 110 of the SETs coupled to the first qubit (signal denoted by reference 204) and the fourth qubit (signal denoted by reference 206).

Figure 4:
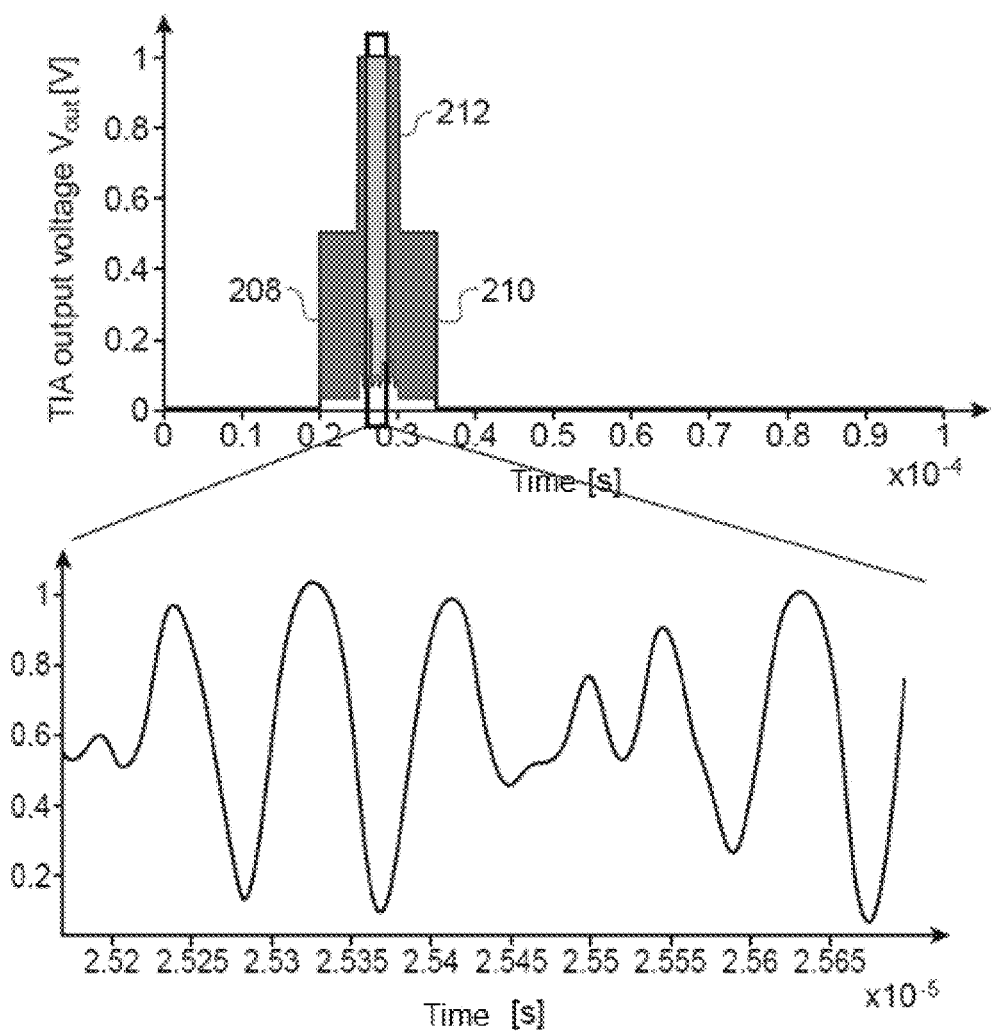

The TIA 118 amplifies the sum of the currents applied to its input, which corresponds to the sum of the currents delivered to the sources 110 of the SETs 104 coupled to the qubits. FIG. 4 shows the output voltage delivered by the TIA 118. In the example shown in FIG. 4, this output voltage has a zero value when none of the electrometers 104 detects a charge modification in the quantum dots 102 of the qubits. When one of the electrometers 104 detects a charge modification in the quantum dot 102 of one of the qubits, the output voltage of the TIA 118 corresponds to a signal with a frequency equal to that of the excitation signal applied to that electrometer 104. References 208 and 210 refer to parts of the output voltage of the TIA 118 corresponding to such a case. Finally, when several electrometers 104 simultaneously detect a charge modification in the quantum dots 102 of several qubits, the output voltage of the TIA 118 combines the frequencies of the excitation signals applied to those electrometers 104 and includes an amplitude proportional to the number of electrometers 104 detecting charge modifications in the quantum dots 102 and delivering non-zero amplitude signals. Reference 212 refers to a part of the output voltage of the TIA 118 corresponding to such a case.

The demultiplexing circuit 120 then demultiplexer the combined signals within the output signal of the TIA 118, thereby separating these signals from each other. The demultiplexed signals are then digitised by the digitising circuit 122. Each of the signals delivered as the outputs of the digitising circuit 122 has a first value, for example equal to 0 V and corresponding to, for example, the logical level '0', when the corresponding electrometer 104 does not detect a charge modification in the quantum dot 102 to which the electrometer 104 is coupled, and has a second value, for example equal to the supply voltage of the digitising circuit 122 and corresponding to, for example, the logical level '1', when the corresponding electrometer 104 detects a charge modification in the quantum dot 102 to which the electrometer 104 is coupled.

Figure 5:
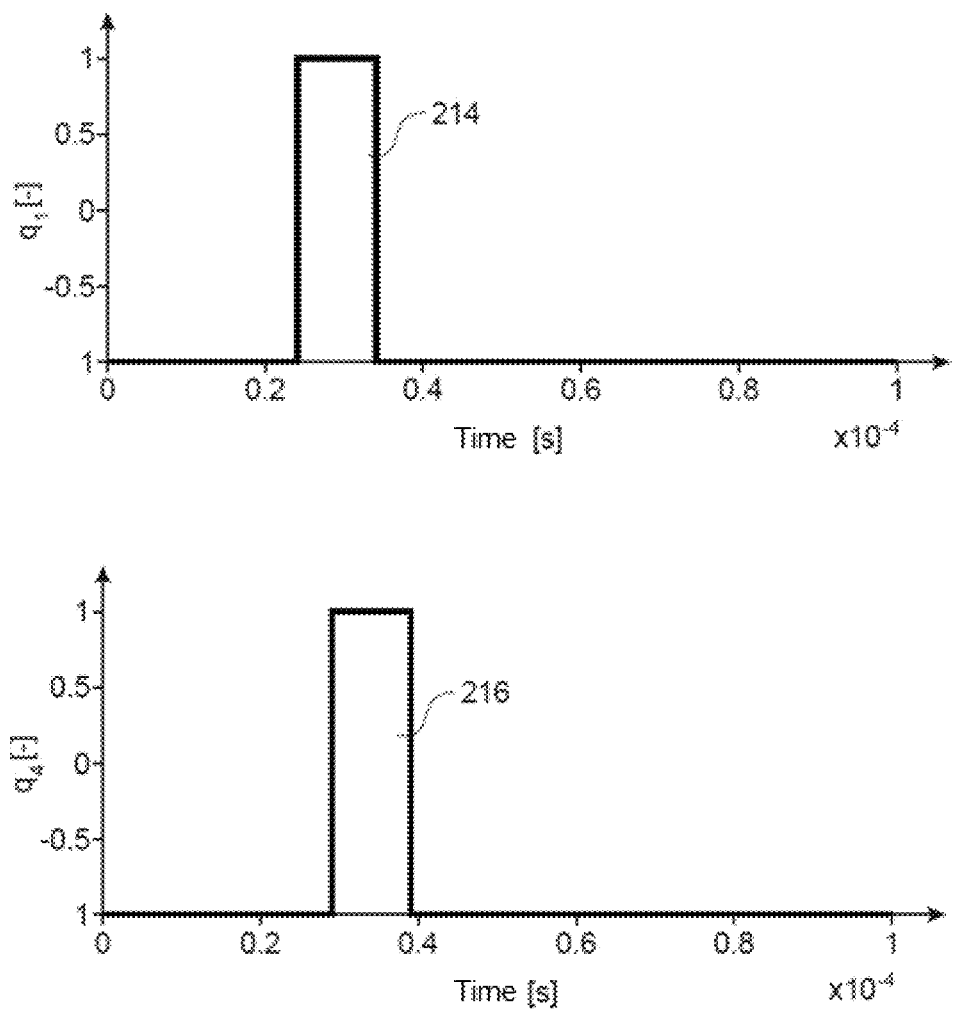

FIG. 5 shows the signals obtained at two of the outputs of the digitising circuit 122. Reference 214 refers to the digital signal obtained which is representative of the charge modification detection performed by the electrometer 104 associated with the first qubit, and reference 216 refers to the digital signal obtained which is representative of the charge modification detection performed by the electrometer 104 associated with the fourth qubit. Each of these two signals takes the logical value '1' when the corresponding electrometer 104 has detected a charge modification in the quantum dot 102 to which the electrometer 104 is coupled. Although not shown, the signals obtained at the other two outputs of the digitising circuit 122 have a zero value due to the fact that no charge modification is detected by the corresponding electrometers 104.

Exemplary embodiments of the various elements of the quantum device 100 are described below.

Figure 6:
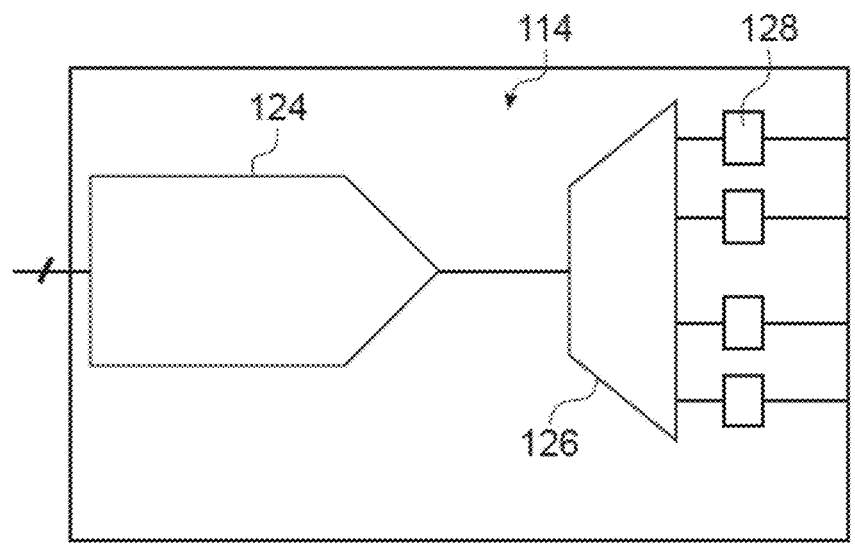
FIG. 6 shows one exemplary embodiment of a circuit for biasing electrometers of the quantum device.

One exemplary embodiment of one of the circuits 114 for biasing the electrometers 104 is shown in FIG. 6. In this example, the circuit 114 includes a digital-to-analogue converter 124 receiving as an input, for example from a digital bus, one or more digital signals and converting this or these digital signals into analogue voltages. An output of the digital-to-analogue converter 124 is coupled to an input of a demultiplexer 126. Each of the outputs of the demultiplexer 126 is coupled to an input of a sample-and-hold device 128. The output of each sample-and-hold device 128 is coupled to at least one electrode of one of the electrometers 104, for example to the drain or source of one of the SETs when the electrometers 104 correspond to such SETs. Sampling and holding performed by each of the sample-and-hold devices 128 makes it possible to maintain, for a period of time, the bias voltage applied to the electrometers 104 at a constant or quasi-constant value. Holding performed by the sample-and-hold devices 128 may be active or passive.

With such circuits 114 for biasing the electrometers 104, a few digital-to-analogue converters 124 make it possible to sequentially store all of the voltages necessary for biasing a large number of electrometers 104 via the large number of sample-and-hold devices 128.

Details of embodiment of such a circuit 114 for biasing the electrometers 104 are, for example, given in M. E. P. V. Zurita et al, "Cryogenic Current Steering DAC With Mitigated Variability," in IEEE Solid-State Circuits Letters, vol. 3, pp. 254-257, 2020.

Figure 7:
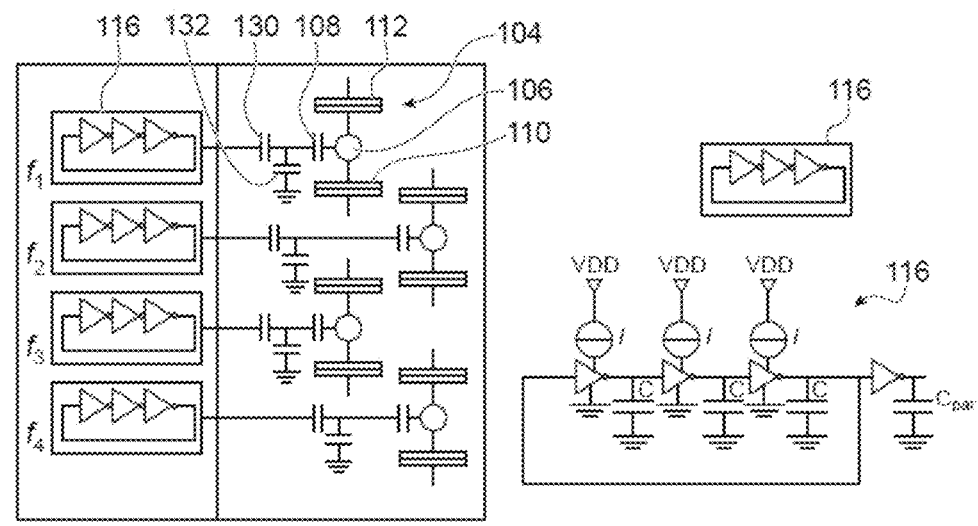
FIG. 7 shows one exemplary embodiment of circuits for applying the excitation signals to input electrodes of electrometers of a quantum device.

One exemplary embodiment of the circuits 116 applying the excitation signals to the input electrodes of the electrometers 104 is shown in FIG. 7. In this example, each circuit 116 corresponds to a ring oscillator comprising inverters and capacitors. The oscillation frequency of such an oscillator 116, and thus the frequency of the excitation signal generated by the oscillator 116, is adjusted by the values and number of capacitors of the oscillator 116, as well as the number of inverters and the values of the bias currents applied to these inverters. In FIG. 7, four circuits 116 are shown, each circuit 116 generating an excitation signal with a different frequency.

For example, with such an oscillator 116 oscillating at a frequency equal to 10 MHz, its power consumption is equal to about 5.3 µW, which is negligible in comparison with the cooling capacity of a 4K cryostat which is about 1 W.

In the example of FIG. 7, two capacitors 130, 132 are interposed between the output of each circuit 116 and the gate 108 of each electrometer 104. These capacitors 130, 132 form voltage dividers for reducing the amplitude of the excitation voltage generated by each circuit 116, thereby avoiding a risk of de-biasing the electrometers 104. The values of these capacitors 130, 132 can be adjustable. In FIG. 7, the stray capacitances of the gates 108 of the electrometers 104 are shown.

Alternatively, the circuit 116 may correspond to another type of oscillator, for example a relaxation oscillator, a harmonic oscillator or a crystal oscillator. The advantage of ring and relaxation oscillators is their low power consumption and small footprint. Harmonic and crystal oscillators, on the other hand, achieve better noise performance, but occupy a larger surface area.

In the device 100, the TIA 118 can amplify currents in the order of one or a few nA delivered by the electrometers 104. The gain of the TIA 118 can therefore be relatively large, in the order of about ten MΩ. Furthermore, its bandwidth may also be relatively significant in order to address a large number of electrometers 104 (each electrometer 104 being excited at a different frequency, for example, a spacing of these frequencies allows false detections to be avoided). Thus, a transimpedance amplifier 118 with very good performance allows use with a large number of electrometers 104 with sufficient fidelity for proper operation of a quantum computer. As an example, the TIA 118 may have a bandwidth between 10 MHz and 30 MHz, a gain of 10 MΩ, an input noise in the order of 10 fA/√(Hz), and a power consumption equal to about 100 µW.

Details of one exemplary embodiment of TIA 118 are described in L. Le Guevel et al, "19.2 A 110 mK 295 µW 28 nm FDSOI CMOS Quantum Integrated Circuit with a 2.8 GHz Excitation and nA Current Sensing of an On-Chip Double Quantum Dot", ISSCC, 2020.

Figure 8:
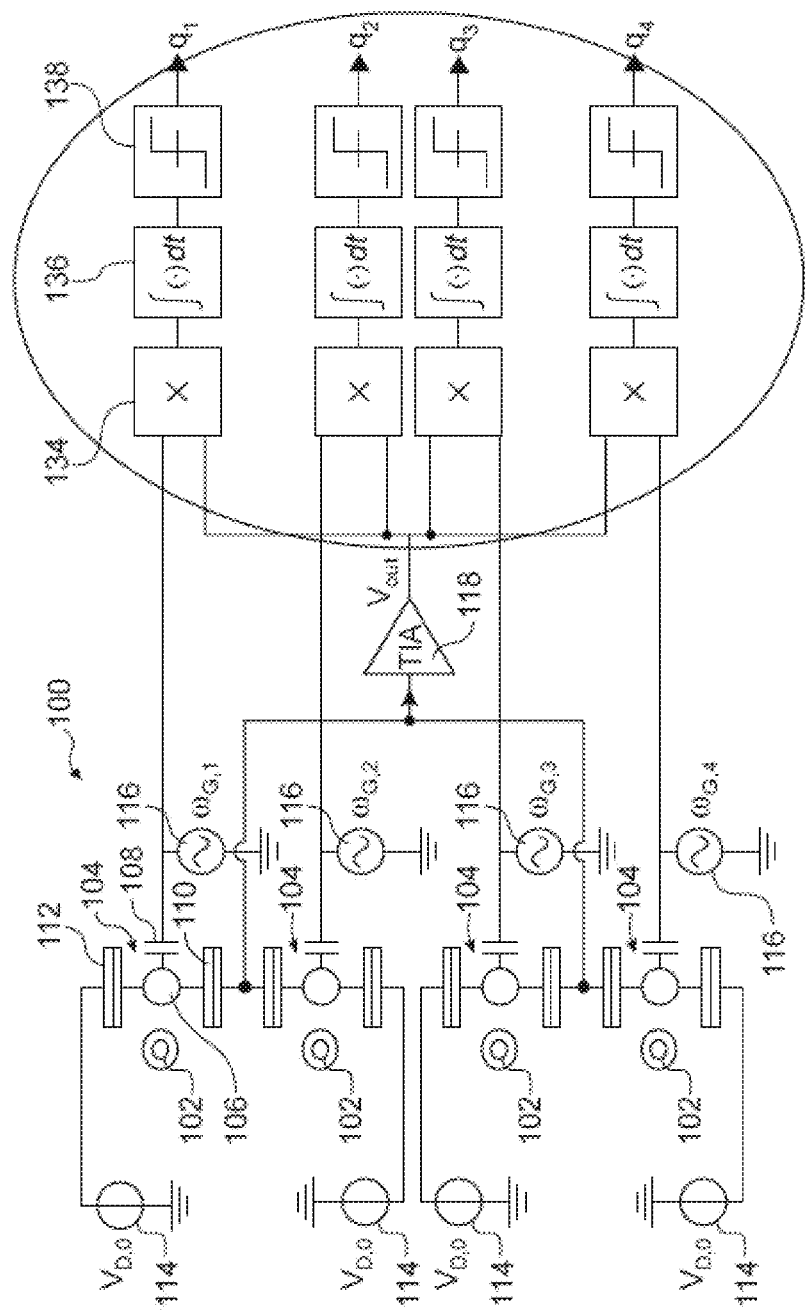
FIG. 8 shows one exemplary embodiment of demultiplexing circuits and digitising circuits of a quantum device.

One exemplary embodiment of the demultiplexing circuit 120 and the digitising circuit 122 is shown in FIG. 8. In order to facilitate understanding of this exemplary embodiment, the other elements of the device 100 according to the first embodiment are also shown.

The demultiplexing circuit 120 includes mixers 134 each comprising a first input coupled to the output of the TIA 118, and a second input coupled to one of the circuits 116. The number of mixers 134 of the demultiplexing circuit 120 is equal to the number of electrometers 104 coupled to the TIA 118, so that the demultiplexing circuit 120 can demultiplex all signals that have been multiplexed as an input to the TIA 118.

When the two signals applied as an input to one of the mixers 134 are at the same frequency, a signal including a DC component is output from the mixer 134. This means that the electrometer 104 having been excited by the signal received as an input from the mixer 134 has detected a charge modification in the quantum dot 102 to which it is coupled. When the two signals applied as an input to one of the mixers 134 are not at the same frequency, the signal output from the mixer 134 does not include a DC component, meaning that the electrometer 104 having been excited by the signal received as an input from the mixer 134 has not detected charge modification in the quantum dot 102 to which it is coupled.

The digitising circuit 122 includes integrators 136, or more generally a set of filtering cells, each comprising an input coupled to the output of one of the mixers 134, as well as comparators 138, or more generally analogue-to-digital converters, each comprising an input coupled to the output of one of the integrators 136. Thus, the output voltages of the mixers 134 are integrated over a period of time by the integrators 136, and then compared to a threshold value by the comparators 138. If the output voltage of one of the mixers 134 contains a DC component, then the output voltage of the integrator 136 coupled to that mixer 134 will increase linearly with time, rising above a threshold voltage applied to the comparator 138 coupled to that integrator 136 if the integration time is sufficiently long. It is thus possible to retrieve which frequency or frequencies is/are contained in the output voltage of the TIA 118, and thus to retrieve the state of each qubit of the device 100. The signals output from the comparators 138 correspond to digital signals in which the logical value '1' is, for example, associated with a high spin state and the logical value '0' is, for example, associated with a low spin state. The outputs from the comparators 138 may be sent outside the cryostat, into a part of the quantum device 100 that is, for example, at room temperature.

Figure 9:
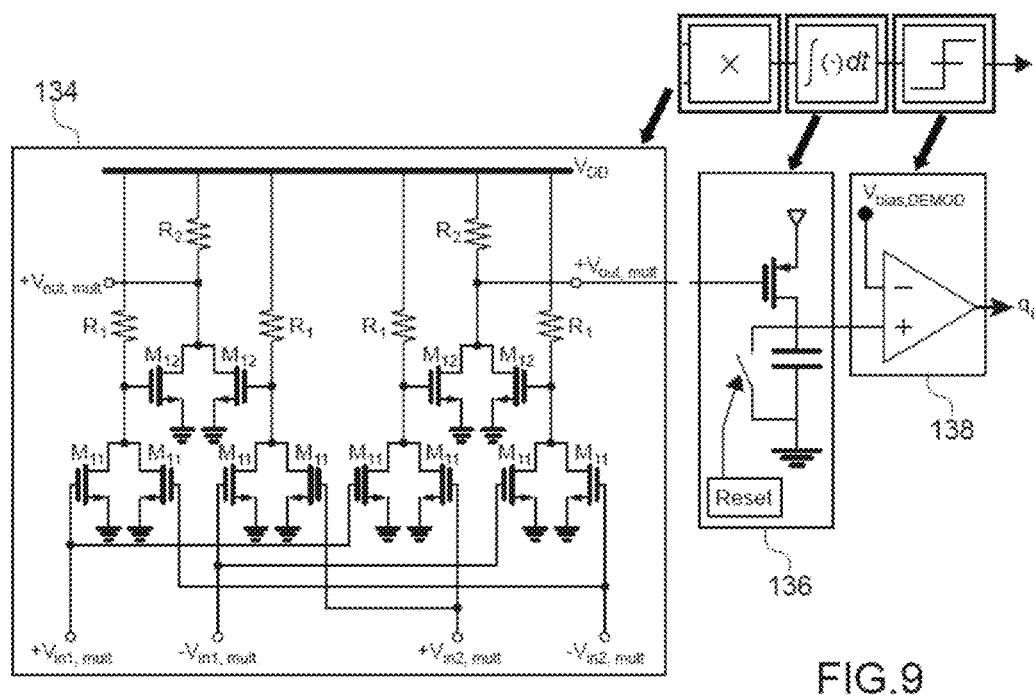
FIGS. 9 and 10 show exemplary embodiments of a mixer, an integrator and a comparator of a demultiplexing circuit of a quantum device.

A first exemplary embodiment of a mixer 134, an integrator 136 and a comparator 138 is shown in FIG. 9. In this first exemplary embodiment, the mixer 134 is configured to multiply the output voltage of the TIA 118 with a voltage from one of the circuits 116 forming an oscillator. The result of this multiplication is integrated for a period of time in a capacitor of the integrator 136, and then compared by virtue of an operational amplifier mounted as a comparator and forming the comparator 138. The result of this comparison, corresponding to a logical level 0 or 1, allows the state of the qubit associated with these elements 134, 136 and 138 to be known. Further explanations relating to the implementation of the mixer 134 can be found in L. S. Lai et al, "An experimental Ultra-Low-Voltage Demodulator in 0.18-µm CMOS", IEEE Transactions on Microwaves and Techniques, Vol. 57, No. 10, October 2009.

Figure 10:
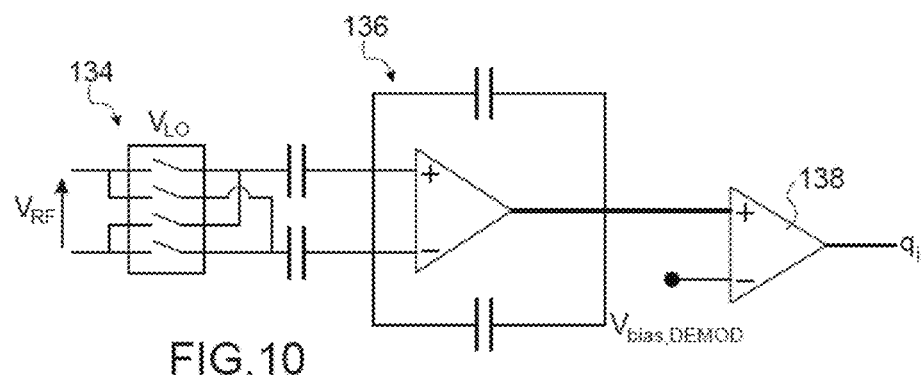

A second exemplary embodiment of a mixer 134, an integrator 136 and a comparator 138 is shown in FIG. 10. In this second exemplary embodiment, the mixer 134 includes a chopper type circuit. The integrator 136 is of the active type and includes an operational amplifier mounted as an integrator. The comparator 138 is similar to the first exemplary embodiment previously described in connection with FIG. 9.

Figure 11:
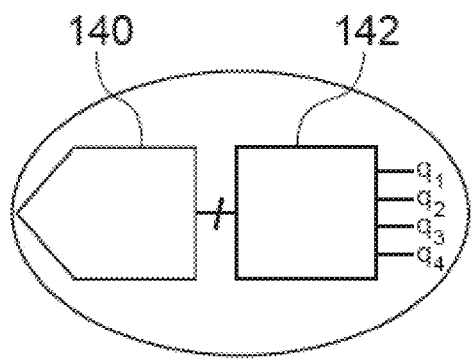
FIG. 11 shows one exemplary embodiment of an analogue-to-digital converter and a demultiplexing circuit of a quantum device.

In the first embodiment previously described, the output signal of the TIA 118 is sent as an input to an analogue type demultiplexing circuit 120, and then as an input to a digitising circuit 122. Alternatively, it is possible that the output signal of the TIA 118 is sent as an input to an analogue-to-digital converter 140, the signal converted then being sent as an input to a digital type demultiplexing circuit 142, as shown in FIG. 11. The analogue-to-digital converter 140 is for example of the successive approximation type (or "ADC SAR"), or of the flash type. Details for making such a converter are, for example, described in H. Zhao et al, "A low-power cryogenic analogue to digital converter in standard CMOS technology", Cryogenics 55-56, 2013, pp. 79-83. The demultiplexing circuit 142 may, for example, implement a Fourier transform of the output signal from the converter 140. Details of embodiment are, for example, given in J. Masciotti et al, "Digital Lock-In Detection for Discriminating Multiple Modulation Frequencies With High Accuracy and Computational Efficiency", IEEE Transactions on Instrumentation and measurement, Vol. 57, No. 1, January 2008.

One exemplary embodiment of a quantum device 100 according to a second embodiment is described below in connection with FIG. 12.

In this second embodiment, the qubits of the quantum device 100 are arranged as a matrix of M rows and N columns, with M and N being integers greater than or equal to 1 and at least one of the numbers M and N is strictly greater than 1. The electrometers 104 are also arranged by forming a matrix of M rows and N columns. This matrix of electrometers 104 is arranged above or below the matrix of qubits such that the quantum dot 102 of each of the qubits is electrostatically coupled to a quantum dot 106 of one of the electrometers 104 lying in proximity to, above or below, the quantum dot 102 of each of the qubits.

The matrix of qubits and the matrix of electrometers 104 can be made in a superimposed manner by implementing a 3D integration method.

The device 100 includes here M circuits 116 for applying at least one excitation signal to at least one input electrode of each of the electrometers 104. All the electrometers 104 arranged on a same row of the matrix are coupled to a same circuit 116 so that a same excitation signal is applied to at least one input electrode of these electrometers 104.

The device 100 further includes N TIAs 118. All the electrometers 104 arranged in a same column of the matrix are coupled to a same TIA 118 so that all the output signals delivered by these electrometers 104 add up and are multiplexed as an input to a same TIA 118.

Figure 12:
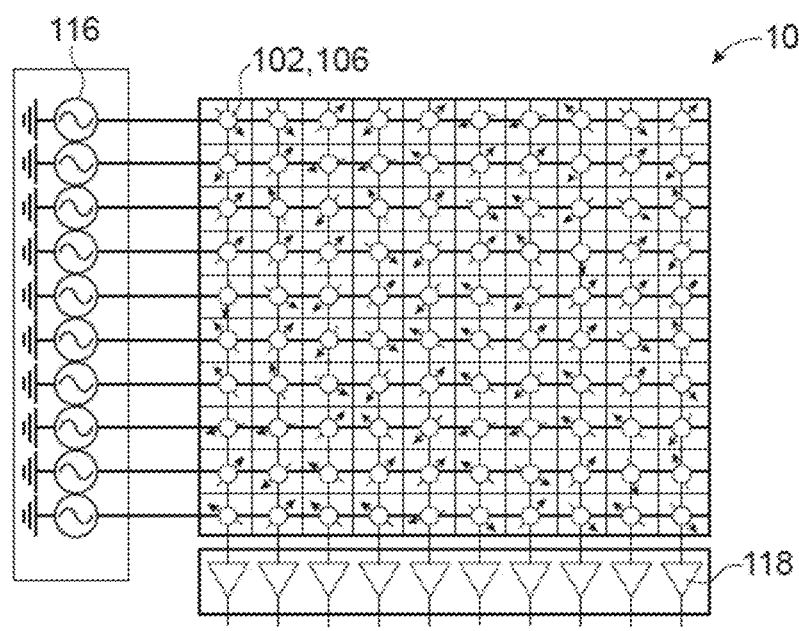
FIG. 12 schematically shows a part of a quantum device according to a second embodiment.

In FIG. 12, the circuits 114 for biasing the electrometers 104 are not shown.

In this second embodiment, and more generally when the device 100 includes several TIAs 118, the output signals of the TIAs 118 may be read out simultaneously or not.

Alternatively to this second embodiment, it is possible that the device 100 includes a number of TIAs 118 less than N. In this alternative, the input to at least one TIA 118 receives signals from more than M electrometers 104. In this case, by triangulating the read-out results, it is possible to retrieve the state of each qubit from the information delivered by the TIAs 118.

Figure 13:
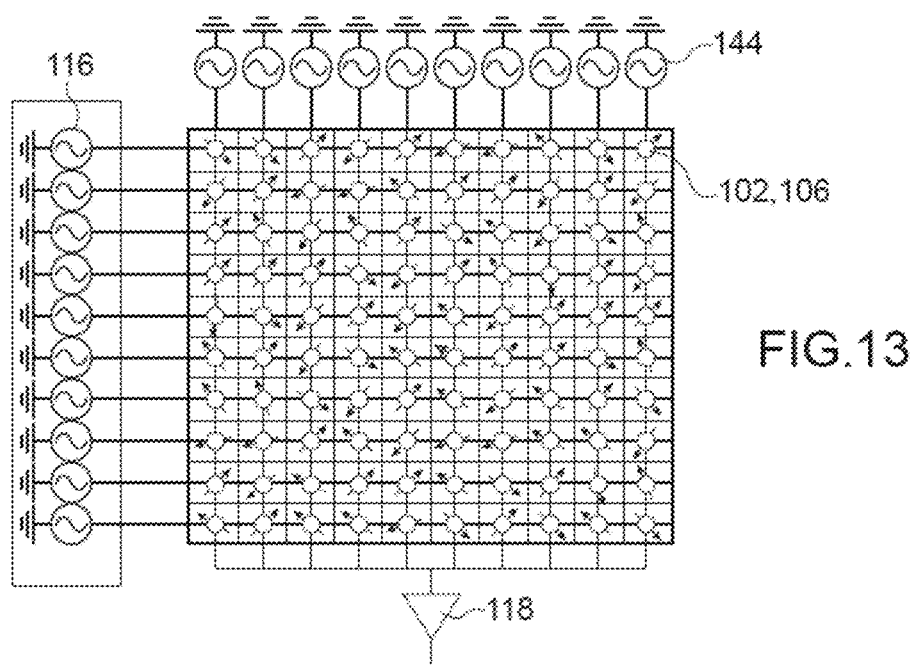
FIG. 13 schematically shows a part of a quantum device according to an alternative to the second embodiment.

For example, it is contemplatable that the device 100 according to this second embodiment includes only one TIA 118. All the signals delivered by the electrometers 104 are in this case multiplexed as an input to this amplifier. The multiplexing achieved is then more complex. For example, considering a matrix arrangement of the qubits and using excitation signals with different frequencies, it is contemplatable to involve only one TIA 118 by applying two different excitation signals to the gate and drain of each electrometer 104: first excitation signals of different frequencies for each row of qubits, and second excitation signals of different frequencies for each column of qubits. Thus, by using different pairs of excitation frequencies for each qubit, it is possible to differentiate them during demultiplexing. Such an alternative is shown in FIG. 13, where first circuits 116 apply the first excitation signals and second circuits 144 apply the second excitation signals.

The exemplary embodiments of the elements of the device 100 previously described in connection with FIGS. 6 to 11 may apply for making the elements of the device 100 according to the second embodiment.

Regardless of the embodiment or alternative of the device 100, the maximum number of qubits that can be included in the device 100 may be determined by the cooling capacities of the cryostat, and thus the electrical power consumed by the different elements located in the cryostat. For example, considering that an oscillator (that is one of the circuits 116) consumes 5 μW, that a TIA 118 consumes 200 μW and that an analogue demultiplexing circuit 120 consumes 100 μW, that the TIAs 118 are placed, together with the qubits and the electrometers 104, in the first part of the cryostat chamber cooled to a temperature of 300 mK and whose cooling capacity corresponds to a maximum power of 10 mW, and that the other electronic elements are placed in the second part of the cryostat chamber cooled to a temperature of 4 K and whose cooling capacity corresponds to a maximum power of 1 W, the number of rows M and the number of columns N of the matrix of qubits are chosen in compliance with the following relationships:

$$N*M*100.10^{-6} + M*5.10^{-6} < 1$$

$$N*200.10^{-6} < 0.01$$

The minimum excitation frequency used to excite the electrometers 104 sets the maximum read-out time taken by the device 100 (need to integrate several periods in order to achieve a reasonable read-out reliability). The maximum excitation frequency $f_M$ is set by the bandwidth of the TIA 118. The spacing between each frequency, $\Delta f$, is also chosen to be large enough not to cause false detections and degrade fidelity of the system. By way of example, the TIA 118 can have a signal to noise ratio, or SNR, equal to 4, have a frequency $f_1$ equal to 10 MHz (to expect to have a read-out time of less than a microsecond), a frequency $f_M$ equal to 30 MHz, and $\Delta f$ of 100 kHz, and still keep a reasonable fidelity (>99%). With this performance, it is thus possible to address a matrix of qubits having $(f_M - f_1)/\Delta f$ rows, that is 200 rows (M=200).

Considering the relationships previously indicated regarding the maximum capacity of the cryostat, the maximum number of columns is equal to 50. Thus, under the conditions indicated above, the quantum device 100 may include a maximum number of qubits equal to 10,000.

In the previously described embodiments, the variable parameter of the excitation signals used corresponds to the frequency of the signals. Alternatively, this parameter may correspond to the phase or amplitude of the excitation signals, or even a combination of several of these parameters (frequency and/or phase and/or amplitude). In this alternative, the different elements of the device 100 may be similar to those previously described, except for the demultiplexing circuit which is configured to perform demodulation adapted to the variable parameter of the excitation signals.

For example, where the discriminating parameter of the excitation signals is the amplitude of those signals (for an excitation signal of a type $a \cdot \sin(\omega \cdot t)$, the discriminating parameter corresponding to the parameter "a"), those amplitudes are chosen so that the value of the amplitude of each of those signals is unique, different from each other and also with respect to the different possible combinations, or sums, of those amplitudes. For example, the values of the amplitudes of the currents resulting from the excitation signals and input in the TIA 118 may correspond to successive multiple values such as: 0.1 nA, 0.2 nA, 0.4 nA, 0.8 nA, 1.6 nA, etc. In this case, a precise measurement of the amplitude of the output voltage of the TIA 118 makes it possible to determine which amplitude or amplitudes are contained in this output voltage, and thus to retrieve the state of each qubit of the device 100. This measurement may be performed by a single TIA 118 summing all the currents delivered by the electrometers 104, then by a demultiplexing circuit 120 which may, for example, correspond to an analogue-to-digital converter making it possible to define, according to the value of the output voltage of the TIA 118, which electrometer or electrometers 104 deliver an output current.

According to another example, when the discriminating parameter of the excitation signals corresponds to the phase of these signals, it is possible to use, for demultiplexing the output signal of the TIA 118, a demultiplexing circuit performing an analogue-to-digital conversion and then an analysis of the digital signal obtained. Alternatively, this demultiplexing can be achieved by analysing the amplitude and phase of the output signal of the TIA 118 using analogue blocks. Use of the phase as a discriminating parameter can be implemented by using two or three excitation signals with different phases, or advantageously combined with another discriminating parameter. In this case, as in the example of FIG. 1, the circuits for biasing the electrometers 114 may be distinct from the circuits for applying the excitation signals 116, and the demultiplexing circuit 120 and digitising circuit 122 may be similar to the previously described exemplary embodiments performing signal discrimination using the different frequencies of the excitation signals.

The invention claimed is:

1. A quantum device comprising:
several spin qubits each comprising at least one quantum dot, the qubits being arranged by forming a matrix of qubits;
several electrometers each electrostatically coupled to a potential well of the quantum dot of one of the spin qubits;
circuits configured to apply at least one AC excitation signal to at least one input electrode of each of the electrometers, configured such that a value of at least one parameter from a frequency, phase and maximum amplitude of each of the excitation signals is different from that of the other excitation signals; each circuit being configured to apply at least one AC excitation signal being configured to apply a same excitation signal to input electrodes of electrometers coupled to qubits arranged on a same row of the matrix of qubits;
a transimpedance amplifier comprising an input electrically coupled to output electrodes, distinct from the input electrodes, of at least two of the electrometers to which output signals are to be delivered; and
a demultiplexing circuit including an input electrically coupled to an output of the transimpedance amplifier, and configured to demultiplex the output signals to be delivered by the electrometers.

2. The quantum device according to claim 1, further including a cryostat including a chamber configured to be maintained at a temperature less than or equal to 4K and in which at least the spin qubits, the electrometers and the transimpedance amplifier are arranged.

3. The quantum device according to claim 1, further including circuits for biasing the electrometers configured to apply DC bias voltages to the electrometers.

4. The quantum device according to claim 3, wherein the circuits for biasing the electrometers comprise:
a digital-to-analogue converter, configured to receive as an input at least one digital signal coding values of bias voltages of the electrometers;
a demultiplexer comprising an input electrically coupled to an output of the digital-to-analogue converter, and several outputs to which the bias voltages of the electrometers are to be delivered; and
sample-and-hold devices each comprising an input electrically coupled to an output of the demultiplexer.

5. The quantum device according to claim 1, wherein the electrometers correspond to single electron transistors and/or quantum point contacts.

6. The quantum device according to claim 5, wherein:
when the electrometers correspond to single electron transistors, the circuits for applying excitation signals are coupled to a gate or source or drain of each of the single electron transistors, or are coupled to the gate and source of each of the single electron transistors, or are coupled to the gate and drain of each of the single electron transistors; and
when the electrometers correspond to quantum point contacts, the circuits for applying excitation signals are coupled to a first of two electrodes of each of the quantum point contacts.

7. The quantum device according to claim 3, wherein the electrometers correspond to single electron transistors and/or quantum point contacts, and wherein the circuits for biasing the electrometers are configured to:
when the electrometers correspond to single electron transistors, apply DC bias voltages to a gate and a drain of each of the single electron transistors when the circuits for applying excitation signals are coupled to at least one of the gate and the drain of each of the single electron transistors, or to a gate and a source of each of the single electron transistors when the circuits for applying excitation signals are coupled to at least one of the gate and the source of each of the single electron transistors; and
when the electrometers are quantum point contacts, apply DC bias voltages to a first of both electrodes of each of the quantum point contacts.

8. The quantum device according to claim 1, wherein the electrometers are arranged by forming a matrix of electrometers arranged facing the matrix of qubits such that the quantum dot of each of the qubits is electrostatically coupled to a quantum dot of one of the electrometers.

9. The quantum device according to claim 1, wherein the output electrodes of electrometers coupled to qubits arranged on a same column of the matrix of qubits are coupled to the input of a same transimpedance amplifier.

10. The quantum device according to claim 1, wherein:
each of the circuits for applying at least one excitation signal, forms a first circuit for applying at least one first excitation signal configured to apply a same first excitation signal to first input electrodes of electrometers coupled to qubits arranged on a same row of the matrix of qubits;
the quantum device further includes second circuits for applying at least one second excitation signal, each configured to apply a same second excitation signal to second input electrodes of electrometers coupled to qubits arranged on a same column of the matrix of qubits;
the first and second application circuits are configured such that a value of at least one parameter from a frequency, phase and maximum amplitude of each of the first and second excitation signals is different from that of the other excitation signals; and
the input of the transimpedance amplifier is electrically coupled to an output electrode of each of the electrometers.

11. The quantum device according to claim 1, further comprising:
a digitising circuit comprising inputs coupled to outputs of the demultiplexing circuit and configured to digitise the output signals to be delivered from the demultiplexing circuit, or
an analogue-to-digital converter interposed between the input of the demultiplexing circuit and the output of the transimpedance amplifier.

12. The quantum device according to claim 11, wherein, when the quantum device includes the digitising circuit:
the demultiplexing circuit includes several mixers each comprising a first input electrically coupled to the output of the transimpedance amplifier and a second input configured to receive one of the excitation signals; and
the digitising circuit includes several integrators each comprising an input electrically coupled to an output of one of the mixers, and several comparators each comprising an input electrically coupled to an output of one of the integrators.

13. The quantum device according to claim 2, further comprising:
a digitising circuit comprising inputs coupled to outputs of the demultiplexing circuit and configured to digitise the output signals to be delivered from the demultiplexing circuit, or
an analogue-to-digital converter interposed between the input of the demultiplexing circuit and the output of the transimpedance amplifier;
wherein the circuits for applying excitation signals, the demultiplexing circuits, and the digitising circuits are arranged in the cryostat chamber.

14. The quantum device according to claim 13, wherein:
the cryostat chamber includes a first part configured to be maintained at a temperature of less than 1K and a second part configured to be maintained at a temperature between 1K and 4K;
the spin qubits, electrometers and transimpedance amplifier are arranged in the first part of the cryostat chamber; and
the circuits for applying excitation signals, demultiplexing circuit and digitising circuit are arranged in the second part of the cryostat chamber.

15. A quantum device comprising:
several spin qubits each comprising at least one quantum dot;
several electrometers each electrostatically coupled to a potential well of the quantum dot of one of the spin qubits;
circuits for applying at least one excitation signal to at least one input electrode of each of the electrometers, configured such that a value of at least one parameter from a frequency, phase and maximum amplitude of each of the excitation signals is different from that of the other excitation signals;
a transimpedance amplifier comprising an input electrically coupled to output electrodes, distinct from the input electrodes, of at least two of the electrometers to which output signals are to be delivered; and
a demultiplexing circuit including an input electrically coupled to an output of the transimpedance amplifier, and configured to demultiplex the output signals to be delivered by the electrometers.

16. The quantum device according to claim 15, wherein a variation in conductance of each electrometer represents a state of a corresponding spin qubit.

17. The quantum device according to claim 15, wherein the excitation signal applied at the input of each electrometer corresponds to a signal that modifies a current generated at the output by said electrometer, the current flowing out of each electrometer corresponding to the output signal delivered to the output electrode of said electrometer.

* * * * *